Figures 1, 2, 3, 4:
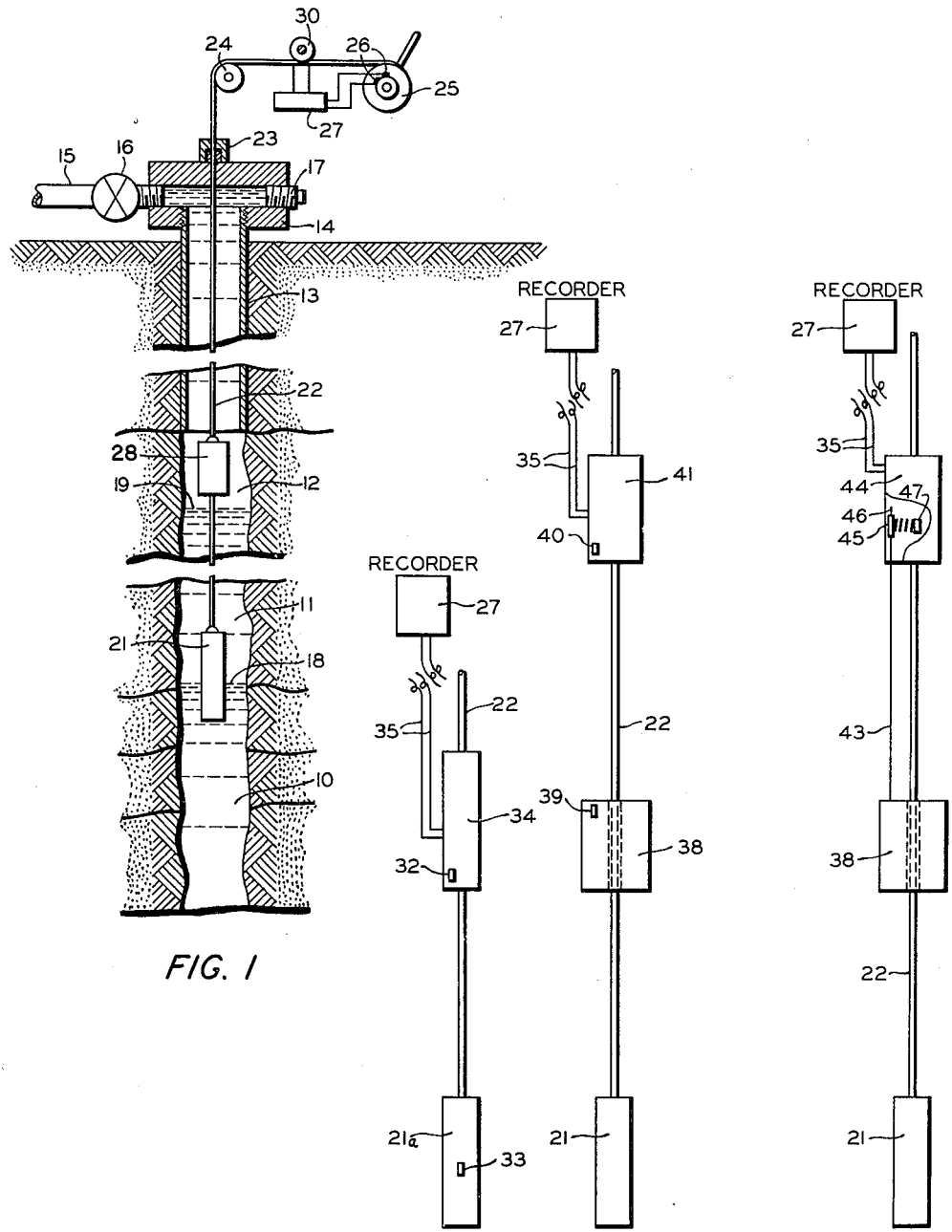

Sept. 20, 1955  H. J. PANKRATZ  2,718,143
METHOD OF AND APPARATUS FOR MEASURING
THE DIAMETER OF A WELL BORE
Filed Oct. 28, 1949

INVENTOR.
H. J. PANKRATZ
BY Hudson & Young
ATTORNEYS

— # United States Patent Office 2,718,143
Patented Sept. 20, 1955

2,718,143

METHOD OF AND APPARATUS FOR MEASURING THE DIAMETER OF A WELL BORE

Howard J. Pankratz, Bartlesville, Okla., assignor to Phillips Petroleum Company, a corporation of Delaware Application October 28, 1949, Serial No. 124,126

14 Claims. (Cl. 73—152)

This invention relates to a method of and apparatus for measuring the area of a well bore. In another aspect, it relates to a method of and apparatus for simultaneously measuring the area of a well bore and the relative permeability of formations surrounding the well bore.

Heretofore, the relative permeability of formations adjacent a well bore has been measured by introducing two liquids of different specific gravities into the well bore, thereby to form an interface between two liquid columns in the bore. Pressure was then applied to the upper column of fluid and the location of the interface simultaneously recorded. As a result, the rapidity with which the lower column of fluid was forced into the adjoining formations, as determined by lowering of the interface, was a measure of the relative permeability of the formations adjoining the well bore.

When operating in accordance with this method, it is necessary to determine the area of the bore hole, for changes in the bore hole area clearly affect the rate at which the interface is lowered and may thus result in erroneous permeability readings for the adjacent formations. This determination of well bore area has been accomplished, in the past, either by making a caliper survey of the well bore hole or by assuming that the well has a constant diameter. Calipers of the type previously utilized are subject to inherent inaccuracies since only a limited number of caliper arms are provided and irregularities in the well bore surface between the caliper arms may result in the apparent diameter reading upon the caliper having a different value than the true bore diameter. Furthermore, difficulties are encountered in correlating the diameter measurements with the interface depth measurements to determine the relative permeability of the adjoining formations.

It is an object of this invention to provide a novel method of and apparatus for measuring the area of a well bore.

It is a further object to provide such a method and apparatus which is particularly adapted for use in combination with an interface detector mechanism so that the interface location and bore diameter are simultaneously measured.

It is a still further object to provide apparatus which is of rugged construction, reliable in operation, and which produces accurate results at a low cost.

Various other objects, advantages and features of the invention will become apparent from the following detailed description taken in conjunction with the accompanying drawings, in which:

Figure 1 is a vertical, sectional view of the apparatus of this invention mounted in a bore hole; and Figures 2, 3, and 4 are modified forms of apparatus suitable for use in carrying out this invention.

Referring now to the drawings in detail, and particularly to Figure 1, the method of my invention consists in providing columns 10, 11, and 12 of liquid in the well bore, these liquids being of different specific gravity. The heaviest liquid, of course, settles to the bottom of the well bore and may conveniently be salt water. A measured volume of liquid is passed into the well bore to form a column 11. The liquid of column 11 is of intermediate specific gravity and may be either an oil base or aqueous drilling mud which should have a very low or negligible filtrate loss. That is, the liquid in this intermediate column should not penetrate the formations adjacent the well bore so that the total amount of liquid in the column 11 is substantially constant as my method is carried out. The upper column 12 is a liquid, such as oil, the specific gravity of which is less than that of the liquid forming columns 10 and 11.

In carrying out my method, the liquid forming the upper column is pumped into the well bore under substantially constant pressure and at a substantially constant rate and, to this end, the bore may be provided with a casing 13, and a casing head 14 to which liquid under pressure is applied through a conduit 15 controlled by a valve 16, the casing head further being provided with a plug 17. When liquid under pressure is supplied to the well bore through the conduit 15, part of the liquid 10 is forced into the formations adjoining the well bore at a rate determined by the formation permeability. As a result, the interface 18 between the columns 10 and 11 descends at a rate which is proportional to the permeability of the formations adjacent this liquid column. In this connection, it will be noted that suitable sealing means, such as any well known packing device, may be placed in the bore a predetermined distance below the interface 18 so that only the relative permeability of the formations above the packer is measured.

As the interface 18 is lowered by continued application of pressure liquid through conduit 15, the interface 19 also is lowered in the well bore. As previously stated, however, the column 11 consists of a liquid having a negligible filtrate loss so that the total quantity of liquid in the column 11 remains substantially constant as the method of my invention is carried out. Evidently, therefore, if the portion of the well bore occupied by column 11 is of restricted diameter, the column 11 will occupy a greater length of the well bore. That is, the distance between interfaces 18 and 19 will be large. In contrast, if the portion of the well bore occupied by the column 11 is of enlarged cross section, the constant volume of liquid forming the column 11 will take up a shorter length of the well bore. That is, the distance between the interfaces 18 and 19 will be decreased. Consequently, it will be apparent that the distance between the interfaces 18 and 19 is a function of the average diameter of the well bore throughout the region occupied by liquid column 11. By knowing the volume of liquid in column 11 the average diameter can readily be calculated.

It is a feature of the invention that the average bore diameter so determined takes into account any irregularities in the cross section of the bore hole which cannot be compensated for with the ordinary logging caliper. That is, if the contour of the bore departs from a circular shape, due to caving or other causes, the liquid column 11 will enter the caved portions of the bore hole and still provide an accurate indication of the average bore diameter. In the usual bore, the liquid column 11 may be made sufficiently short that no error is introduced by assuming that the average diameter represented by the distance between interfaces 18, 19 is the actual bore diameter at the region under consideration.

In accordance with the invention, the location of the interfaces 18, 19 is continuously determined as the pressure liquid is pumped into the well. The rate of descent of interface 18 indicates the relative permeability of the formations adjacent the well bore in the usual manner while the distance between interfaces 18, 19 provides a continuous indication of the well bore diameter at the region under consideration. I have devised interface locating apparatus of novel construction to continuously and accurately measure the locations of the two interfaces.

This apparatus includes an interface-locating device 21 of conventional construction, such as the electrical system shown in Patent 2,413,435 to L. A. Courter, the gamma ray type disclosed by Patent 2,385,378 to R. G. Piety, or the float type shown by the copending application of White, Serial No. 737,936, filed March 28, 1947, which is Patent 2,557,488. The device 21 is suspended in the bore by a cable 22 which extends through a stuffing box 23 in casinghead 14, and over a pulley 24 to a windlass 25 which is provided with slip rings 26 for making connection to electrical leads forming an integral part of the cable 22. The slip rings may be connected in circuit with a recorder 27 in certain embodiments of the invention. In other embodiments, a recording device embodying a plurality of recording circuits may be provided by utilizing additional slip rings on the windlass 25 together with additional conductors in the cable 22. In all embodiments of the invention, the cable is lowered into the bore at such a rate as to maintain the device 21 continuously at the interface 18, in a manner well understood by those skilled in the art. A second device 28, positioned above device 21 on cable 22, represents either casing 34 of Figure 2, casing 41 of Figure 3, or casing 44 of Figure 4 whose function is described hereinafter.

I may also provide a depth measuring instrument 30 which cooperates with the cable 22 and the recorder 27 to indicate the depth of the device 21 at all times upon the recorder chart, with the result that the chart, when driven at a predetermined speed, continuously indicates the rate of descent of interface 18 and, thus, the relative permeability of the formations adjacent the well bore when corrected for the bore diameter in the manner now to be described. This depth measuring apparatus preferably is of the type more fully described in Borden and Thynell, Principles and Methods of Telemetering, Reinhold Publishing Corporation, New York (1948), pages 68 and 69.

In the preferred embodiment of the invention shown by Figure 2, an interface-locating device 21a is provided with a capsule 33 of radioactive material positioned at interface 18 which directs penetrating radiation through the liquid column 11 and a portion of liquid column 12 to a radiation detector 32 mounted in a casing 34 which is carried by cable 22 and disposed above the interface 19. In general, the liquid forming column 11 has a different characteristic for the absorption of radioactive radiation than does the liquid forming column 12. Hence, as the distance between interfaces 18, 19 changes responsive to variations in bore diameter, the absorption of radiation by the liquid between radiator 33 and detector 32 changes in a corresponding manner. Hence, the electrical output of the detector unit is proportional to the distance between interfaces 18, 19, which, in turn, is proportional to the average well bore diameter. The output of detector 34 is transmitted to the surface by conductors 35, which actually form a part of cable 22, and these conductors lead to the recorder 27 which, preferably, produces a record of average bore diameter upon the same chart which records the rate of descent of interface 18. The relative permeability of the formations is then readily calculated from the rate of descent of the interface 18 and the well bore diameter.

In the embodiment of the invention shown by Figure 3, a float 38 is mounted for longitudinal movement along the cable 22, this float having a density such that it will maintain its position at all times at the interface 19. The float 38 includes a radiation device 39 which transmits radiation to a detector 40 carried by a casing 41 fixed to the cable 22 at a position substantially above that of interface 19. As the float 38 moves upwardly and downwardly in accordance with changes in position of interface 19, the total amount of the liquid forming column 12 between the radiation source and detector varies in a corresponding manner. Since interface-locating device 21 is always located at the interface 18, it will be evident that the output of detector 40 is proportional to the distance between interface 19 and casing 41, which, in turn, is representative of the distance between interfaces 18, 19. This latter distance is proportional to the well bore diameter. The output of detector 40 is fed to recorder 27 by conductors 35 in the manner explained in connection with Figure 2.

In the embodiment of the invention shown by Figure 4, a float 38 is provided similar to that shown in Figure 3. In this modification, however, the float is not provided with a radiation source but, instead, has a light cord 43 attached thereto which extends upwardly to a casing 44 carried by the cable 22 at a location above that of interface 19. The cord 43 passes through an opening 46 in casing 44 and is carried by a spring-actuated reel 45 which is operatively connected to a suitable electrical telemetering transmitter 47, which includes a variable resistor having a voltage source applied thereacross, the potential drop taken across said resistor is, accordingly, proportional to the length of cord 43 which is unwound from the reel and, therefore, to the distance between interfaces 18 and 19. The output voltage of the telemetering transmitter is carried to the surface by the leads 35 which extend to the recorder 27 in the manner explained in connection with Figures 2 and 3.

It will be evident that in all embodiments of the invention the rate of descent of interface-locating device 21 is recorded upon a chart, the same chart being utilized to record the distance between the interfaces 18, 19 and, hence, the diameter of the well bore. The relative permeability of the formations may be readily calculated from these data without the necessity of making a caliper survey and without the inaccuracies resulting from arbitrarily assuming a given bore hole diameter. Such an assumption may introduce considerable error into the permeability determinations particularly where there is a substantial degree of caving in the formations adjoining the well bore. In drilling wells it is desirable to ascertain the well bore diameter to determine the amount of cement to be utilized in cementing the casing. It will be apparent that my invention can be used for the sole purpose of measuring well diameter in such operations, the columns of liquid being introduced into the well by reverse circulation and then removed, if desired, by direct circulation. I also contemplate that radioactive capsules of the proper specific gravities to float at the respective interfaces may be provided or that the column 11 may be formed from a radioactive liquid or from a liquid having radioactive material in suspension or solution therein. In such a modification, the float 38 may be eliminated and the detector positioned at any desired location above interface 19. This modification is particularly suitable in determining the diameter of drilled wells where it is not necessary to accurately locate the interface 18. In such a case, the float or other interface-locating device 21 may also be eliminated.

While the invention has been described in connection with a present, preferred embodiment thereof, it is to be understood that this description is illustrative only and is not intended to limit the invention, the scope of which is defined by the appended claims.

I claim:

1. The method of determining the average diameter of a well bore which comprises introducing, into a well bore, in succession, three columns of liquids of progressively lower specific gravities, the second column being of predetermined volume and formed from a liquid having a low filtrate loss, applying pressure to the upper column to force the three columns to successively lower depths within the well, and continuously determining the distance of the interface between the first and second columns from the interface between the second and third columns whereby the average diameter of said well bore can be calculated from the length and volume of said second column of liquid.

2. The method of determining the average diameter of a well bore and the relative permeability of formations adjacent said well bore, said bore containing a column of liquid having a relatively high specific gravity, which comprises introducing a column of liquid of predetermined volume of intermediate specific gravity and a column of liquid of relatively low specific gravity into said well bore, adding liquid of relatively low specific gravity under pressure at the top of said well bore, continuously recording the rate of descent of the interface between said columns of intermediate and relatively high specific gravity and continuously recording the distance between said interface and the interface between said liquids of intermediate and relatively low specific gravity whereby the average diameter of the well bore can be calculated from the length and volume of said column of liquid of intermediate specific gravity.

3. The method of determining the average diameter of a well bore and the relative permeability of formations adjacent said well bore, said bore containing a column of liquid having a relatively high specific gravity, which comprises introducing a column of liquid of a predetermined volume of intermediate specific gravity and a column of liquid of relatively low specific gravity into said well bore, adding liquid of relatively low specific gravity at a constant rate and under substantially constant pressure at the top of said well bore, continuously recording the rate of descent of the interface between said columns of intermediate and relatively high specific gravity and continuously recording the distance between said interface and the interface between said liquids of intermediate and relatively low specific gravity whereby the average diameter of the well bore can be calculated from the length and volume of said column of liquid of intermediate specific gravity.

4. The method of determining the average diameter of a well bore wherein said bore contains a quantity of liquid having a relatively high specific gravity, which comprises introducing a predetermined volume of liquid of intermediate specific gravity into said well bore, introducing a fluid of relatively low specific gravity into said well bore at sufficient pressure to force said two liquids within the well bore to successively lower depths, and continuously determining the distance of the interface between said two liquids from the interface between said second-mentioned liquid and said fluid whereby the average diameter in said well bore can be calculated from the length and volume of the column of said second-mentioned liquid.

5. Apparatus for determining simultaneously the diameter of a well bore and the relative permeability of formations adjoining said well bore which comprises, in combination, a first interface-locating device adapted to float at the interface between first and second immiscible liquids, said second liquid having a known volume and being of lower specific gravity than said first liquid, a cable for lowering said device into a well bore, a recorder, means driven by said cable to record the depth of said device on said recorder, means carried by said cable in spaced relation with said device to detect the interface between said second liquid and a third liquid immiscible with said second liquid and having a lower specific gravity than said second liquid wherein said last-mentioned interface is located between said last-mentioned means and said device, and means for recording the relative positions of said two interfaces on said recorder in correlation with the depth of said device.

6. Apparatus for determining simultaneously the diameter of a well bore and the relative permeability of formations adjoining said well bore which comprises, in combination, an interface-locating device adapted to float at the interface between first and second immiscible liquids, said second liquid having a known volume and being of lower specific gravity than said first liquid, a cable for lowering said device into a bore hole, a recorder, means driven by said cable for recording the depth of said device on said recorder, a radiation source carried by said device, a radiation detector carried by said cable at a position so as to be above said second liquid when said device is suspended in said well bore, and means for recording the output of said detector on said recorder in correlation with the depth of said device.

7. Apparatus for determining simultaneously the diameter of a well bore and the relative permeability of formations adjoining said well bore which comprises, in combination, a first interface-locating device to float at the interface between first and second immiscible liquids, said second liquid having a known volume and being of lower specific gravity than said first liquid, a cable for lowering said device into a well bore, a recorder, means driven by said cable for recording the depth of said device on said recorder, a float movably mounted on said cable above said device when said device is suspended in said well bore, said float being adapted to float at an interface between said second liquid and a third liquid immiscible with said second liquid, said third liquid having a lower specific gravity than said second liquid, a radiation source carried by said float, a radiation detector carried by said cable above said float when said cable and said float are suspended in said well bore, and means for recording the output of said detector on said recorder in correlation with the depth of said device.

8. Apparatus for simultaneously determining the diameter of a well bore and the relative permeability of formations adjoining said well bore which comprises, in combination, an interface-locating device adapted to float at the interface between first and second immiscible liquids, said second liquid having a known volume and being of lower specific gravity than said first liquid, a cable for lowering said device into a well bore, a recorder, means driven by said cable for recording the depth of said device on said recorder, a float movably mounted on said cable above said device when said device and said cable are suspended in said well bore, said float being adapted to float at the interface between said second liquid and a third liquid immiscible with said liquid and having a lower specific gravity than said second liquid, a casing mounted on said cable so as to be above said float when said float and said cable are suspended in said well bore, a reel in said casing, a cord extending from said reel to said float, and means for recording the length of said cord between said reel and said float on said recorder in correlation with the depth of said device.

9. Apparatus for measuring simultaneously the diameter of a well bore and the relative permeability of formations adjoining said well bore which comprises, in combination, an interface-locating device adapted to float at the interface between first and second immiscible liquids wherein said second liquid has a known volume and being of lower specific gravity than said first liquid, a cable for suspending said device in the well bore to measurable depths, a float movably mounted on said cable to float at the interface between said second liquid and a third liquid immiscible with said second liquid and having a lower specific gravity than said second liquid, a casing mounted on said cable so as to be above said float when said float and said cable are suspended in said well bore, means carried in part by said casing to detect the position of said float with respect to said casing, and indicating means connected to said last-mentioned means to provide a measurement of the position of said float with respect to said casing whereby said measurement can be correlated with the depth said device is lowered into the wall.

10. Apparatus for determining simultaneously the diameter of a well bore and the relative permeability of formations adjoining said well bore which comprises, in combination, an interface-locating device adapted to float at the interface between first and second immiscible liquids wherein said second liquid has a known volume and being of lower specific gravity than said first liquid, a cable for lowering said device into a well bore, a recorder, means driven by said cable for recording the depth of said device on said recorder, a float mounted on said cable to float at the interface between said second liquid and a third liquid immiscible with said second liquid and having a lower specific gravity than said second liquid, a casing carried by said cable so as to be above said float when said cable and said float are suspended in a well bore, and means carried in part by said casing and connected to said recorder for recording on said recorder the position of said float with respect to said casing in correlation with the depth of said device in said well bore.

11. Well logging apparatus comprising a first interface-locating device adapted to float at the interface between first and second immiscible liquids in a well, said second liquid having a known volume and being of lower specific gravity than said first liquid, a cable for lowering said device into a well bore, and means carried by said cable to measure the position relative to said device of the interface between said second liquid and a third liquid in the well which is immiscible with said second liquid and which has a lower specific gravity than said second liquid, whereby the average diameter of the well can be calculated from the volume of said second liquid and the measured position of said second-mentioned interface relative to said first-mentioned interface which represents the length of the column of said second liquid in the well.

12. The combination in accordance with claim 11 wherein said means comprises a radiation source carried by said device, and a radiation detector carried by said cable at a position above said second liquid when said device is lowered into the well.

13. The combination in accordance with claim 11 wherein said means comprises a float movably mounted on said cable so as to be positioned at the interface between said second and said third liquids, a radiation source carried by said float, and a radiation detector fixed to said cable at a position above said second liquid when said device is lowered into the well.

14. The combination in accordance with claim 11 wherein said means comprises a float movably mounted on said cable so as to be positioned at the interface between said second and third liquids, a casing mounted on said cable above said float, a reel in said casing, a cord extending from said reel to said float, and means connected to said reel to measure the length of said cord extending from said reel to said float.

References Cited in the file of this patent

UNITED STATES PATENTS

| | | |
|---|---|---|
| 1,889,889 | Ennis | Dec. 6, 1932 |
| 2,236,583 | Selvig | Apr. 1, 1941 |
| 2,412,363 | Silverman | Dec. 10, 1946 |
| 2,413,435 | Courter | Dec. 31, 1946 |
| 2,450,265 | Wolf | Sept. 28, 1948 |
| 2,456,233 | Wolf | Dec. 14, 1948 |
| 2,473,713 | Kingston et al. | June 21, 1949 |
| 2,508,496 | Conzelman et al. | May 23, 1950 |
| 2,517,603 | Silverman | Aug. 8, 1950 |
| 2,524,933 | Silverman | Oct. 10, 1950 |
| 2,557,488 | White | June 19, 1951 |